(12) United States Patent
Lee (10) Patent No.: US 6,178,513 B1
(45) Date of Patent: Jan. 23, 2001

(54) POWER CONTROL APPARATUS AND METHOD USING DIGITAL SWITCH IN DISPLAY UNIT

(75) Inventor: Ji-Young Lee, Suwon-si (KR)

(73) Assignee: Samsung Electronics Co., Ltd., Suwon (KR)

(*) Notice: Under 35 U.S.C. 154(b), the term of this patent shall be extended for 0 days.

(21) Appl. No.: 09/109,902

(22) Filed: Jul. 2, 1998

(30) Foreign Application Priority Data

Jul. 2, 1997 (KR) ................................................. 97-30533

(51) Int. Cl.[7] ........................................................ G06F 1/26
(52) U.S. Cl. ........................ 713/300; 713/310; 713/324; 713/340
(58) Field of Search ................................. 713/300, 310, 713/340, 320, 324

(56) References Cited

U.S. PATENT DOCUMENTS

| | | | |
|---|---|---|---|
| 4,972,457 | * 11/1990 | O'Sullivan | 379/59 |
| 5,675,814 | * 10/1997 | Pearce | 713/300 |
| 5,745,105 | * 4/1998 | Kim | 345/212 |
| 5,954,523 | * 9/1999 | Bablock | 439/79 |
| 5,958,020 | * 9/1999 | Evoy et al. | 710/3 |

* cited by examiner

Primary Examiner—Ario Etienne
(74) Attorney, Agent, or Firm—Robert E. Bushnell, Esq.

(57) ABSTRACT

A power control apparatus in a display unit having a universal serial bus (USB) hub includes: a microcomputer producing a control signal for switching a power management state to an OFF mode or a normal mode according to "ON/OFF" operation of a digital switch; a power supply for supplying overall power to circuits in the display unit; and a switching unit for switching power supply to a deflection circuit and a video circuit according to the power control signal from the microcomputer. The power to the display unit is switched using the digital switch, and a predetermined voltage is continuously supplied to the microcomputer even in an OFF state of the display unit. As a result, the microcomputer selectively forwards the control signal to the switching unit according to existence and/or non-existence of sync signals, a display data channel (DDC) signal, or a USB signal received from a computer, as well as the types of those signals.

25 Claims, 7 Drawing Sheets

POWER CONTROL APPARATUS AND METHOD USING DIGITAL SWITCH IN DISPLAY UNIT

CLAIM OF PRIORITY

This application makes reference to, incorporates the same herein, and claims all benefits accruing under 35 U.S.C. §119 from my applications entitled METHOD AND APPARATUS FOR CONTROLLING A POWER OF DISPLAY APPARATUS USING A TACT SWITCH filed in the Korean Industrial Property Office on Jul. 2, 1997 and there duly assigned Serial No. P97-30533 by that Office.

BACKGROUND OF THE INVENTION

1. Technical Field

The present invention relates to a power control apparatus and method in a display unit and, more particularly, to a power control apparatus and method wherein, instead of an existing analog switch, a digital switch is utilized for controlling and adjusting a power supply according to input of a sync signal, a display data channel (DDC) signal, or a universal serial bus (USB) signal.

2. Related Art

In some configurations of a display monitor, a special power switch is located closed to a knob installed at a predetermined location on a front surface of a monitor case, and switching on and off of the power to the monitor is accomplished by operation of the knob. Conversely, when the power switch is located a distance from the knob, the power switch cannot be directly turned on and off by operation of the knob, and therefore a special guide between the knob and power switch is necessary for proper operation of the switch. In the latter configuration, an accurate operational distance between the power switch and the knob is mandatory in order to insure proper operation of the power switch.

However, the above-described structure has drawbacks and shortcomings. Notably, a poor switching operation results from a change in the length of the knob, and from an error occurring during assembly of the knob and the power switch inserted into a printed circuit board. Moreover, when the knob is located a distance from the power switch, poor operation can result as a result of a change in the length of the guide which transmits the switching signal between the knob and the power switch. In short, such an arrangement results in the production of inferior goods, as well as in an increase the production cost. Accordingly, special manufacturing procedures and extra labor is required.

Another disadvantage of contemporary monitors results from the fact that certain data (e.g., DDC data, USB communication data, sync signals) transmitted from the computer to the monitor are not effective when the monitor is turned off.

Certain monitors employ a power switching system which uses an analog switch. However, this has the disadvantage that a separate power switch for the monitor has to be turned on and off whenever a power switch of the computer is turned and off. For such an analog switch, an elastic member is compressed by a pushing motion of the user, and the elastic member returns to an original state when the external force exerted by the user on the power knob is removed. In addition, power switches for the computer and monitor are separately installed, and this increases the production cost. Finally, in such a system, the functions of the signals "DDC, USB and sync" from the computer cannot be carried out or achieved without turning on the monitor.

Therefore, there is a need for the development of a system wherein the functions of the USB signal, DDC signal and sync signal provided by the computer to the monitor are effective even when the monitor is turned off. There is also a need for the development of a such a system in which production cost are cut by use of a digital switch instead of a separate analog power switch for the monitor.

SUMMARY OF THE INVENTION

An object of the present invention is to implement the functions of a USB signal, a sync signal or a DDC signal provided by a computer to a monitor even when the monitor is in an "OFF" state.

Another object of the present invention is to cut down production cost by using a digital switch instead of a separate analog power switch for a monitor.

To achieve these and other advantages, and in accordance with the purpose of the present invention as embodied and broadly described, a power control apparatus in a display unit having a universal serial bus (USB) hub includes: a microcomputer for producing a control signal for switching a power management state to an OFF mode or a normal mode according to "ON/OFF" operation of a digital switch; a power supply for supplying overall power to the circuits in the display unit; and a switching unit for switching a power supply provide to power to a deflection circuit and a video circuit according to the power control signal from the microcomputer. In accordance with the invention, the power to the display unit is switched using the digital switch and a predetermined voltage is continuously supplied to the microcomputer, even in an OFF state of the display unit. As a result, the microcomputer selectively forwards the control signal to the switching unit according to existence and/or non-existence of sync signals, a display data channel (DDC) signal, or a USB signal provided by a computer and the types of such signals.

In this invention, when power to the monitor is cut off using the digital switch, the power for the operation of the microcomputer is continuously provided. In other words, the power to the monitor is controlled using the digital switch under the condition that alternating current (AC) is continuously supplied to the monitor.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

With reference to the accompanying drawings, a configuration and operation of the present invention will now be described.

Figure 1:
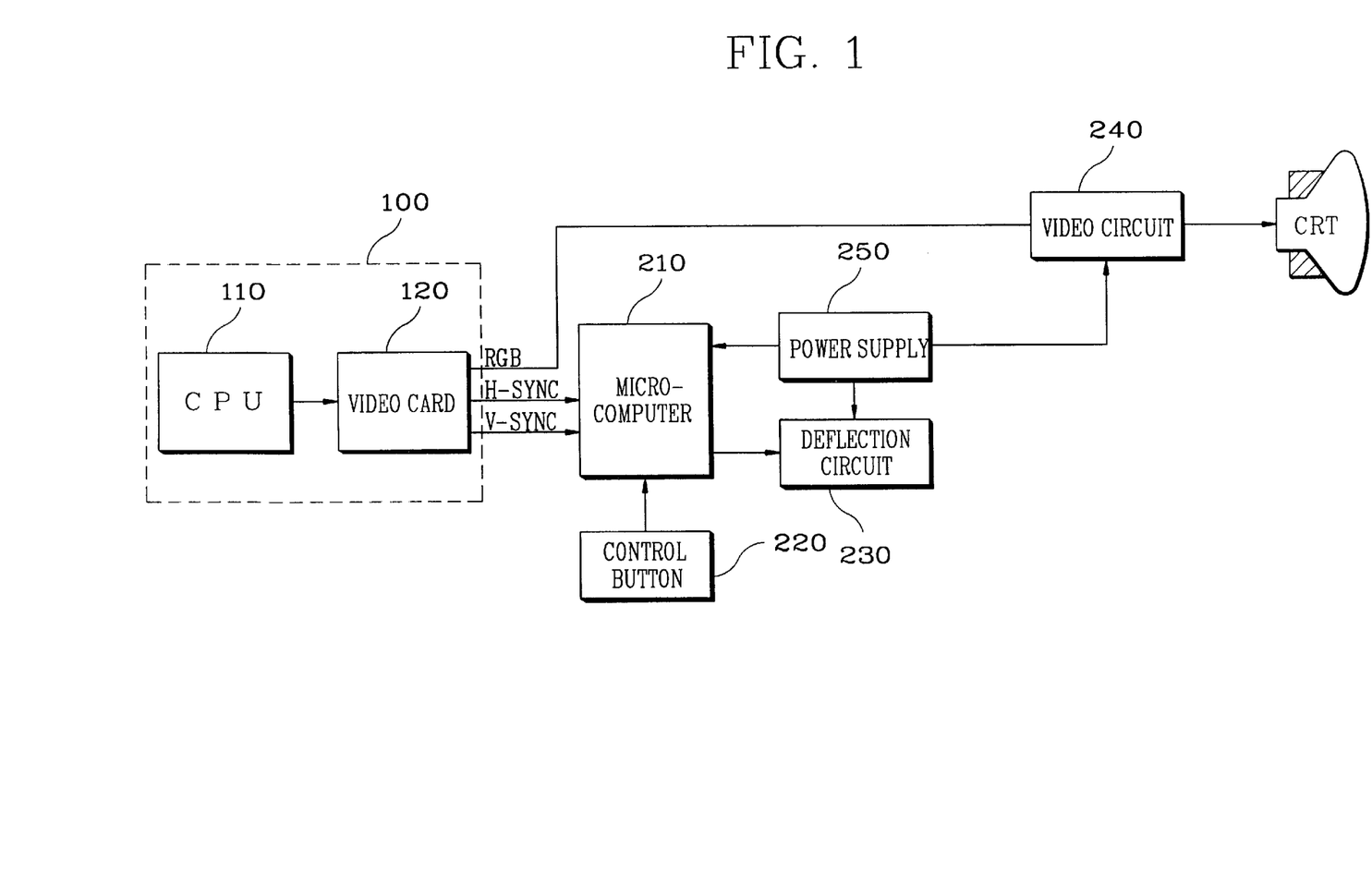
FIG. 1 is a block diagram of a display unit.

A schematic configuration of a monitor which is used as a display unit in a computer system is shown in FIG. 1.

The computer 100 includes a central processing unit (CPU) 110 for processing signals inputted through a keyboard (not shown) and generating data corresponding to a processed result, and a video card 120 for processing the data transmitted from the CPU 110 to generate a video signal (R, G, B) and producing a horizontal sync signal (H_Sync) and a vertical sync signal (V_Sync) for synchronizing the video signal.

The video signal (R, G, B) and horizontal and vertical sync signals produced by the video card 120 in the computer 100 are applied to a monitor via a video signal cable (not shown).

A microcomputer 210 produces image control signals, such as an image coordination signal and a reference oscillation signal responsive to the horizontal and vertical signals applied over the cable, and applies them to succeeding stages.

A control button unit 220 applies a signal corresponding to a selection by a user to the microcomputer 210.

A horizontal/vertical output circuit or deflection circuit 230 receives the reference oscillation signal and screen control signal from the microcomputer 210, and synchronizes a raster.

A video circuit 240 amplifies the video signal applied from the video card 120.

Electric power is supplied to the microcomputer 210, horizontal/vertical output or deflection circuit 230 and video circuit 240, respectively, by a power supply circuit 250.

In a monitor, when a special power switch is close to a knob which is installed at a predetermined location on the front surface of a monitor case, switching of the power is accomplished by operation of the knob. Conversely, when the power switch is displaced away from the knob, the power switch cannot be directly turned "ON" or "OFF" by the operation of the knob. Thus, a special guide between the knob and power switch is necessary for operating the switch. In such a configuration, a predetermined distance should be kept between the power switch and the knob in order to operate the power switch. Namely, an accurate operation distance is mechanically mandatory.

This structure has drawbacks and shortcomings. Namely, a bad switching operation is caused by a change in the length of the knob resulting from an injection modification, and by an error occurring during assembly of the knob and the power switch inserted into a printed circuit board (PCB). In addition, when the knob is distant from the power switch, bad operation can be caused by a change in the length of the guide which transmits a switching signal between the knob and power switch.

These drawbacks can cause production of inferior goods during manufacturing, resulting in an increase in production cost. Moreover, a special process and extra labor is required to install the power switch during the manufacturing process.

Furthermore, the DDC data, USB communication, or sync signals transmitted from the computer are not effective when the monitor is an OFF state. That is, no function can be performed until the monitor is turned "ON".

The term "DDC" indicates a function of exchanging information with the computer using a D-Sub system. This function allows a computer to automatically provide an optimal image state corresponding to a monitor by transmission of various information about the monitor to the computer via a D-Sub cable without requesting an input from the user on the monitor.

Usually, most users do not have knowledge about the highest resolution of their monitor or what resolution is appropriate for currently used software. Since the users do not have knowledge of the resolution and do not have the ability to find an appropriate resolution for software requiring high resolution, such as computer-aid design (CAD) or game software, they cannot make the best use of the monitor even though they possess a highly or sophisticated functional monitor.

However, when the DDC function is provided, the monitor sends information about itself (known as EDID) to the computer and, in turn, the computer automatically displays an optimal image for the software being used within limits of the monitor's performance, thereby creating an optimal state of use for the user.

The information, EDID, transmitted from the monitor to the computer comprises the manufacturer's identification (ID), the product ID or a model name, information as to whether or not a display power management signaling (DPMS) function is provided, the cathode-ray tube characteristic, and the timing.

The DDC data transmitted from the computer to the monitor contains various signals concerning image control functions, such as adjustment of horizontal position and performance of degaussing.

When the monitor is in an "OFF" state, the sync signal or DDC signal cannot be transmitted from the computer to the monitor, and thus they are meaningless.

Figure 2:
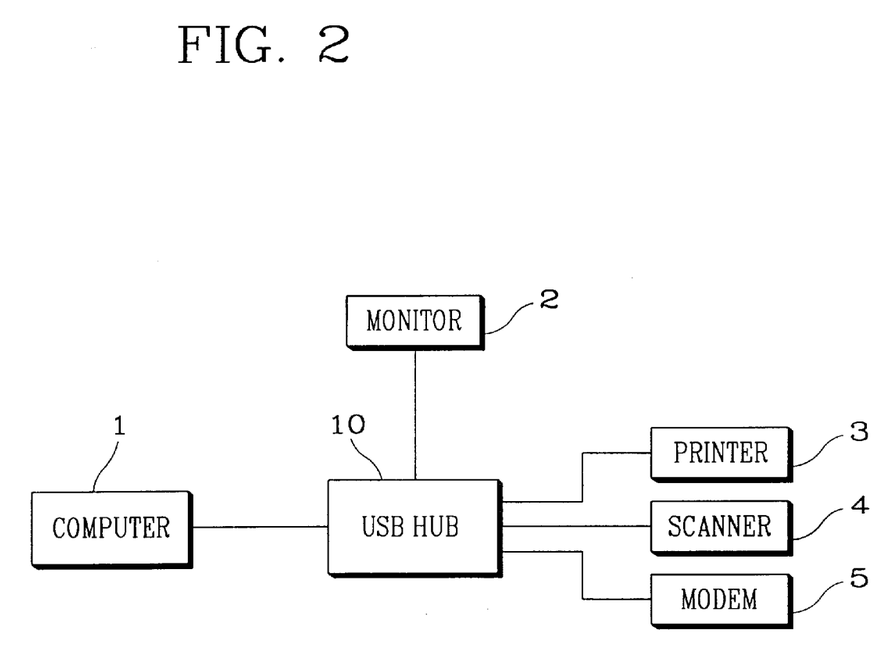
FIG. 2 shows a configuration of a computer system including a USB hub.

A signal transmitted through a USB hub is also not effective when the monitor is in the OFF state. A detailed description of the USB is given below. To meet requirements of more convenient peripheral equipments, as shown in FIG. 2, a specification using the USB has been developed.

As shown in the drawing, a computer 1 and various peripheral equipment, such as a monitor 2, printer 3, scanner 4, and external modem 5, are disposed around the USB hub 10.

When using USB hub 10, it is not necessary for the user to disassemble a main body of the computer in order to connect peripheral equipment or relevant cards thereto. Instead, appending the peripheral equipment becomes as easy as installing a lamp on a desk.

The peripheral equipment 2-5 can be easily connected to the computer 1 through an expansion hub or independent USB hub 10. Expansion hubs provide additional connection sockets, thus forming a tree-shaped connection with layers accumulated therein. Each peripheral equipment 2-5 is allowed to be displaced by several meters from the other equipment or from expansion hub 10.

Figure 3:
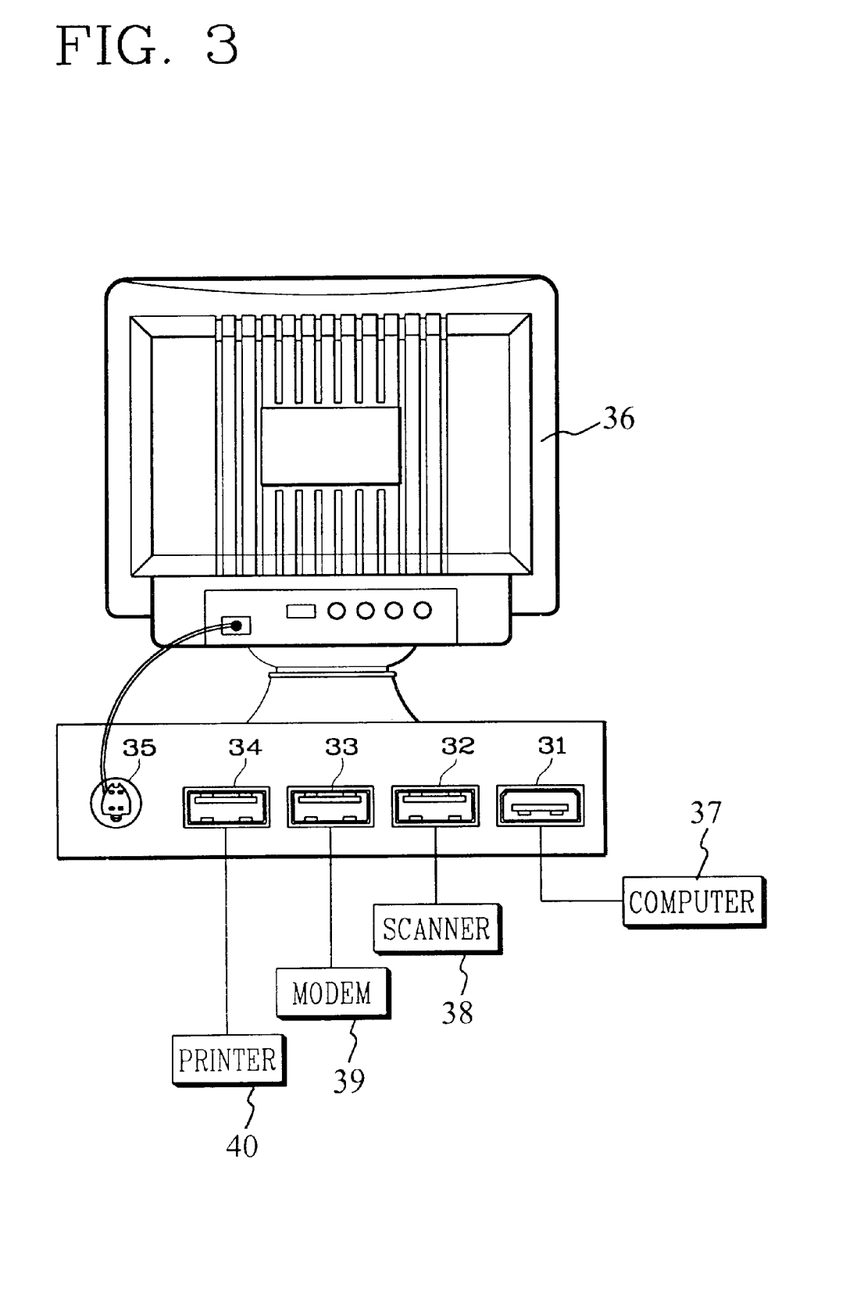
FIG. 3 is an example showing a monitor stand where the USB hub is installed.

FIG. 3 shows an example where the USB hub is installed on the rear surface of a stand of the monitor. The USB hub can be installed on the inside or on the side or front surface of the monitor.

As shown in FIG. 3, a single up stream port 31, three down stream ports 32, 33 and 34, and a connector 35 for supplying power to the USB hub are provided.

The up stream port 31 is for transmission of signals to the monitor 36 or peripheral equipment coupled to the down stream ports 32–34 from a device to which it is coupled. In this example, the up stream port 31 is coupled to the computer 37. The respective down stream ports 32–34 are coupled to the scanner 38, external modem 39 and printer 40, respectively. An instruction is received from the computer 37 via the up stream port 31 and is transmitted to each peripheral equipment 38–40 via the down stream ports 32, 33 and 34, respectively.

When using a USB hub such that the power for the USB hub is supplied via the monitor 36, the power supply to the USB power connector 35 is cut off when the power of the monitor 36 is turned "OFF". In this case, if control signals from the computer 37 for peripheral equipment, such as the printer 40 and scanner 38 coupled to the USB hub, are applied to the monitor 36, the signals are neglected. Since the power supply from the monitor 36 is cut off, the USB hub does not operate so that data transmission is not accomplished.

A power switch system using an analog switch has a disadvantage where a separate power switch for the monitor has to be turned "ON/OFF" whenever a power switch of the computer is turned "ON/OFF". For this analog switch, an elastic member is compressed by a pushing motion of the user, and it returns to an original state due to elasticity when an external force exerted on the power knob is removed, thereby turning "ON/OFF" the power. In addition, the power switches for the computer and monitor are separately installed, thereby increasing the product cost due to high cost of materials.

In this system, the functions of the signals and the DDC data from the computer and USB communication cannot be carried out or achieved without turning "ON" the monitor.

Figure 4:
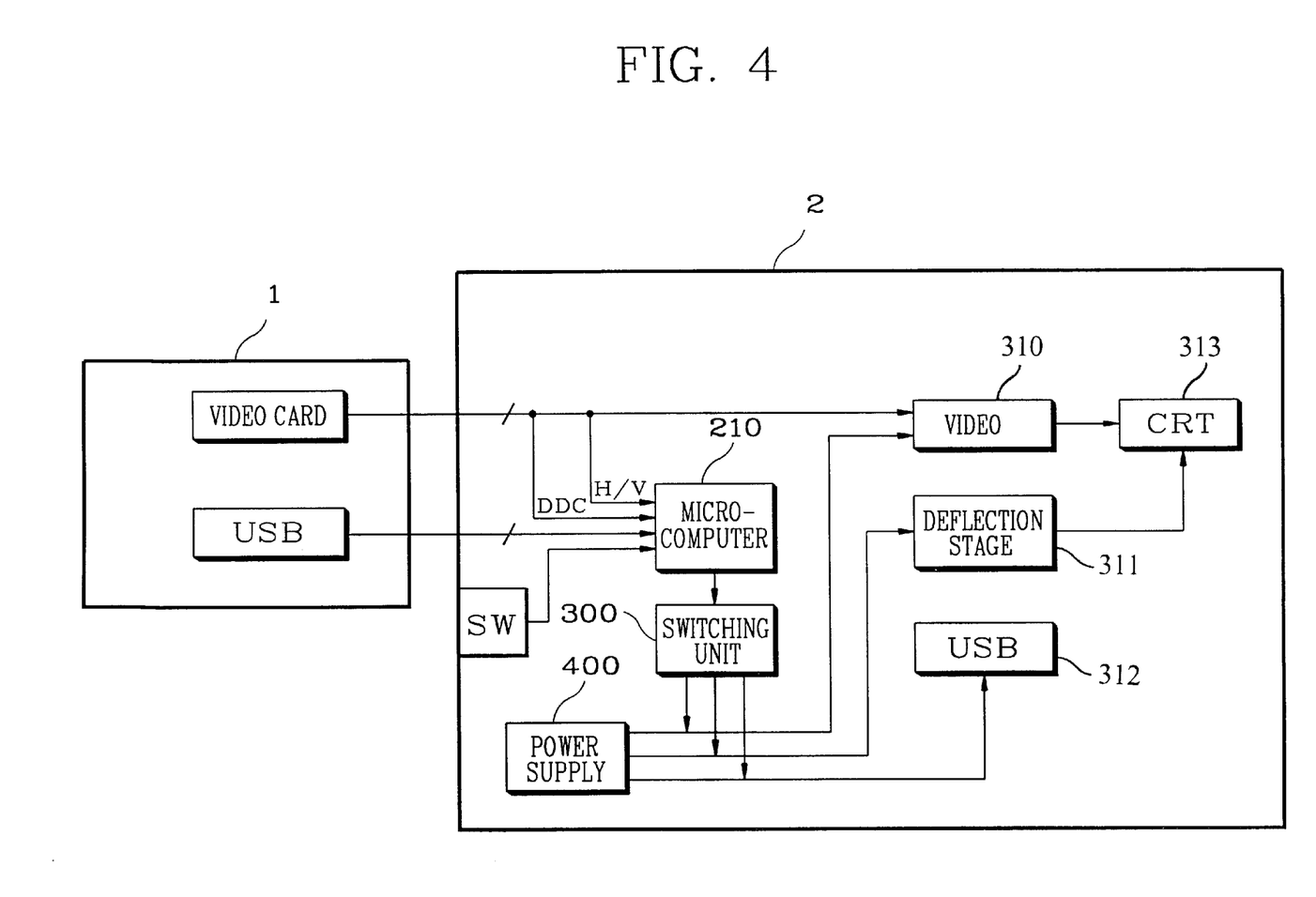
FIG. 4 shows a configuration of a monitor according to the present invention.

As shown in the configuration of the monitor of the present invention in FIG. 4, a digital switch SW is coupled to a microcomputer 210. The digital switch SW, which is preferably an electronic switch, generates a single drive pulse upon exertion of a single push motion thereon, and goes back to an original state upon removal of the motion. Most buttons used for remote control and utilized for control of household electric appliances, such as a TV, correspond to this digital switch.

A user can control a power supply to make a system go to an OFF mode or a normal mode using this digital switch SW. An output terminal of the microcomputer 210 is coupled to a switching unit 300 which switches the power supplied from a power supply 400 to video stage 310, deflection stage 311 and USB hub 312, respectively, using its output signal. The switching unit 300 selectively switches the power to be supplied to the respective video stage 310, deflection stage 311, and USB hub 312 according to an output signal of the microcomputer 210.

The user turns the power "ON/OFF" using the digital switch SW. In this case, a 5 power voltage is continuously supplied to the microcomputer 210, so that the microcomputer 210 can always recognize the digital switch SW. If the switch SW is pressed, the microcomputer 210 recognizes this operation and sends a corresponding control signal to the switching unit 300 so as to switch the monitor from the "OFF" mode to the normal mode, or from the normal mode to the "OFF" mode.

Figure 5:
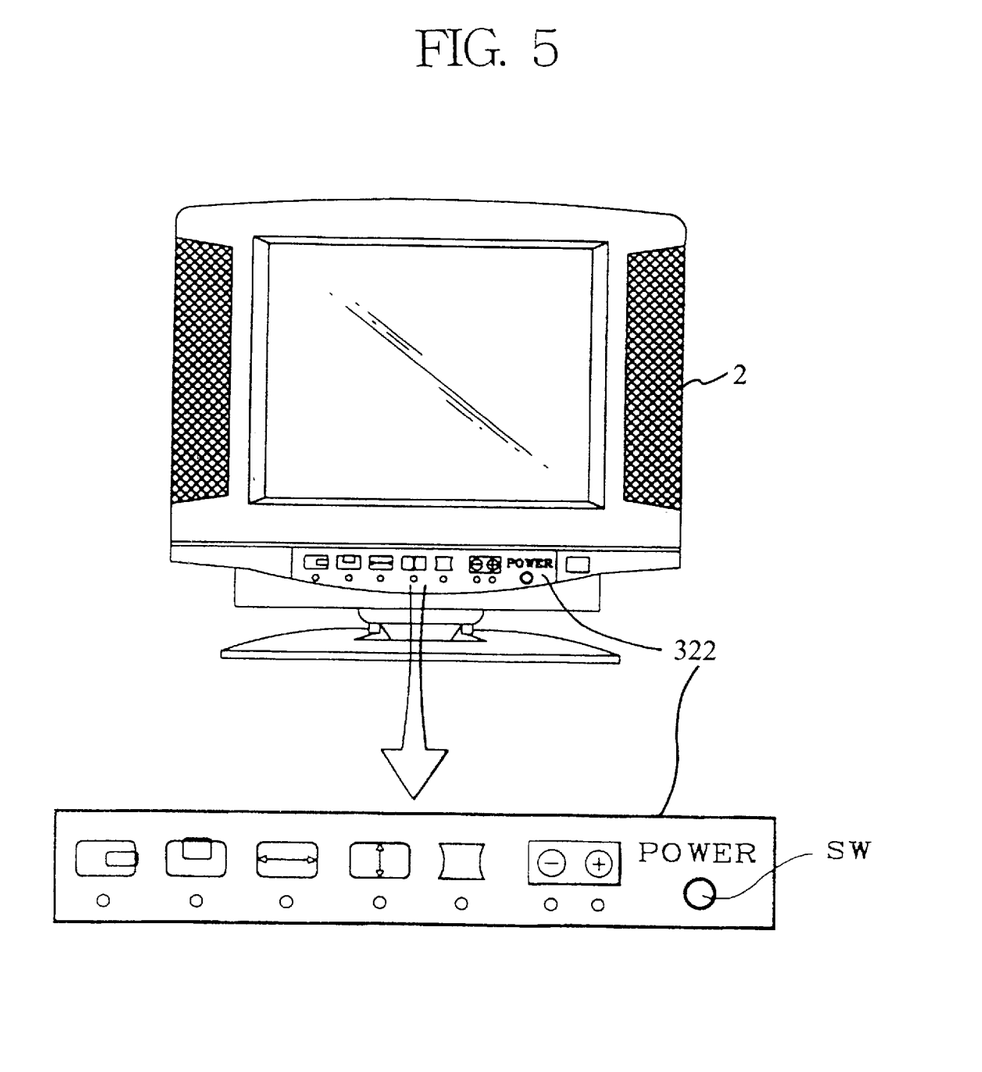
FIG. 5 shows an example where the digital switch depicted in FIG. 4 is installed in the monitor.

The digital switch SW, as shown in FIG. 5, can be disposed at a control button unit in the lower front portion 322 of the monitor 2. As illustrated, the digital switch SW can be used as a substitute for the analog power switch.

The 5 power voltage, which is rectified by an AC power supply (not shown), is supplied to the microcomputer 210 (FIG. 4). This power voltage is continuously supplied to the microcomputer 210, even when the digital switch SW is turned "OFF". Therefore, if the monitor 2 is in the "OFF" mode, the microcomputer 210 receives signals and performs "ON/OFF" operations relating to power, DDC communication, or USB hub functions according to the nature of each signal.

Figure 6:
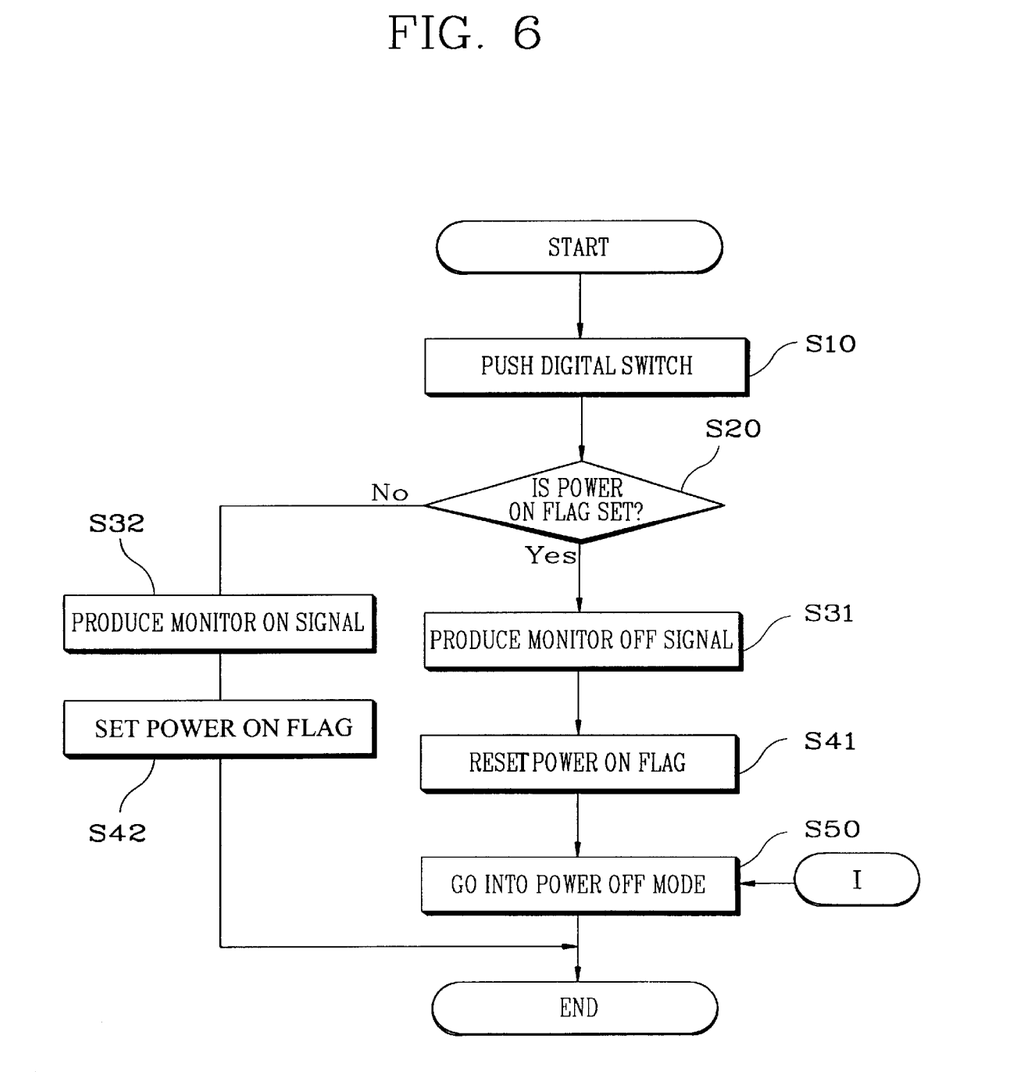
FIG. 6 is a flow chart of a power control method using the digital switch according to the present invention.

With reference to the flow chart in FIG. 6, the operation of the present invention will now be described.

When the digital switch SW formed on the front surface 322 of the monitor 2 is pressed (S10), the microcomputer 210 checks the state of a power ON flag (S20).

A power control signal of the monitor 2 is transmitted to the bases of switching transistors (not shown) in the switching unit 300. The "ON/OFF" state of each switching transistor depends on the control signal.

If the digital switch SW is pressed in the state where the power ON flag (Power_flag) is set—that is, the monitor 2 is in the "ON" state—a control signal for turning "OFF" the power to the monitor 2 is produced (S30) and the power ON flag is reset (Power_flag=0) (S40).

This control signal is applied to each switching transistor in the switching unit 300, and thus the power to be supplied to succeeding stages, such as the deflection stage 311 and high voltage stage 400, is cut off.

In other words, when the control signal for turning "OFF" the monitor 2 is forwarded, the power supply to the deflection stage 311, video stage 310, and the high voltage stage 400 for supplying high voltage to an anode of CRT 313 is cut off, so that the monitor 2 goes to the power OFF mode (S50).

Conversely, if Power_flag=0 at step (S20), a monitor ON signal is produced (S30), and the power ON flag is set (Power_flag=1) (S40).

Figure 7:
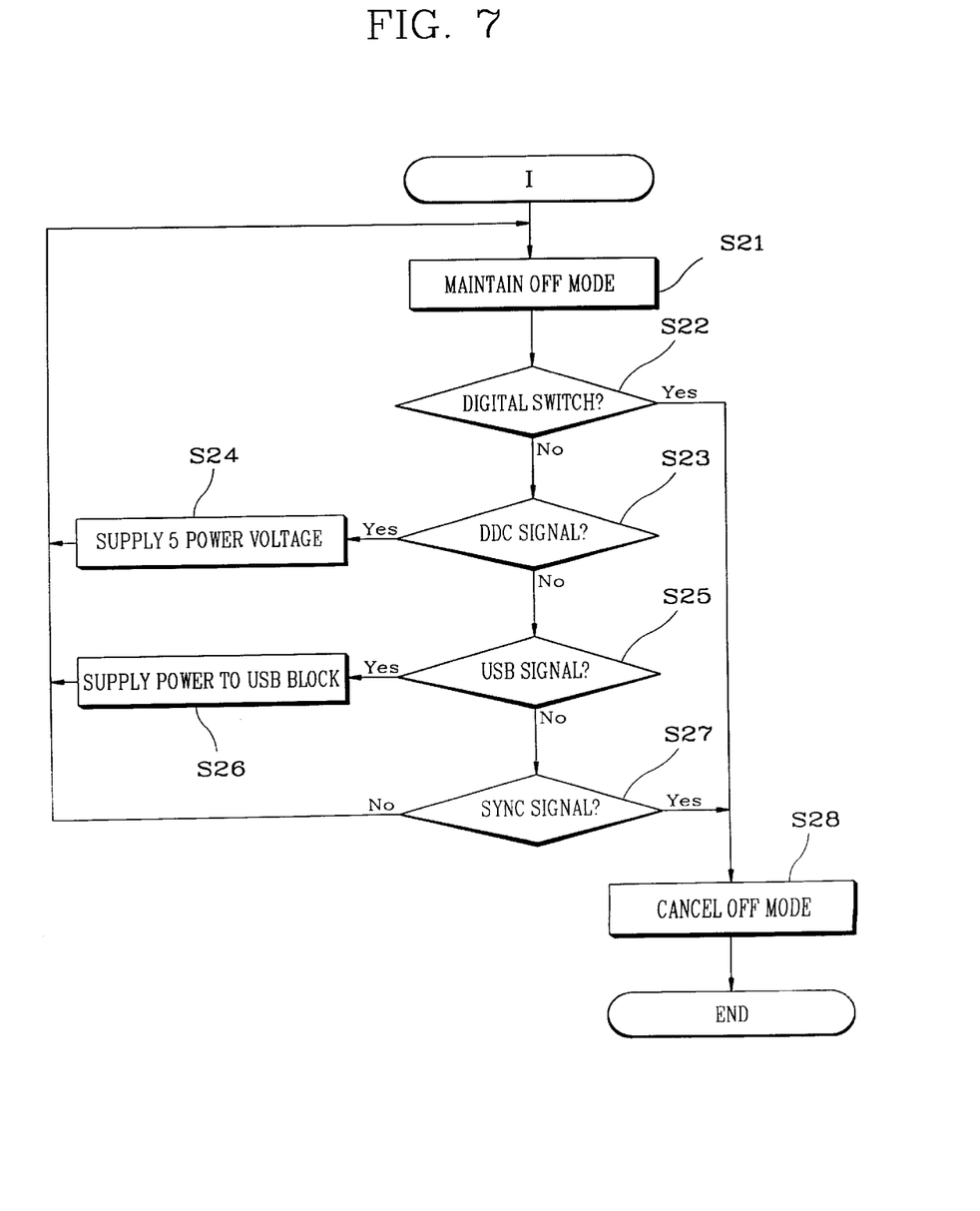
FIG. 7 is a flow chart of a power control method differently controlling the power supply based upon the kind of signal recognized by way of an interrupt mode.

Referring to FIG. 7, while the monitor 2 is in the power OFF mode (S21), the microcomputer 210 receives external signals by way of an interrupt procedure.

It will be noted that the 5 power voltage is supplied to the microcomputer 210 even when the monitor 2 is in the power OFF mode.

If the digital switch SW is pressed so as to produce the power OFF mode (S22), the power to the monitor 2 is turned "ON" and the power ON flag is set (Power_flag=1) (S28).

If the switch SW is not pressed, a signal is checked to determine whether or not it is the DDC signal (S23). If it is the DDC signal, the 5 power voltage is supplied only to the microcomputer 210, and the power supply to the other sections is cut off (S24).

If the signal is not the DDC the signal, signal is checked further to determine whether or not it is the USB signal (S25). If it is the USB signal, as received via the USB hub, power is supplied to a USB 312 (S26).

If the signal is not the USB signal, a determination is made as to whether or not it is a sync signal (S27). If it is (i.e., horizontal and vertical sync signals (H/V_Sync) as received from the computer 1), overall the power to the monitor 2 is turned "ON", canceling the power OFF mode (S28).

As illustrated, the present invention controls the power supply using digital switch SW instead of an analog switch, thereby allowing DDC and USB systems to be utilized even in the "OFF" state of the monitor 2. This overcomes the drawbacks of the analog switch, and makes it possible to utilize the peripheral equipment coupled to the computer 1 via the USB hub, even in the "OFF" state of the monitor 2.

It will be apparent to those skilled in the art that various modifications and variations can be made in a power control apparatus and method using a digital switch in a display unit of the present invention without deviating from the spirit or scope of the invention. Thus, it is intended that the present invention cover the modifications and variations of this invention provided they come within the scope of the appended claims and their equivalents.

What is claimed is:

1. A power control apparatus in a display unit having a universal serial bus (USB) hub, the apparatus comprising:
   microcomputer means for producing a control signal for selectively switching a power management state to an OFF mode and to a normal mode according to off and on operation, respectively, of a digital switch;
   power supply means for supplying power to circuits in the display unit; and
   switching means for switching power supply to a deflection circuit and a video circuit according to the control signal from the microcomputer means;
   wherein the power to the display unit is switched using the digital switch and a predetermined voltage is continuously supplied to the microcomputer means, even in an OFF state of the display unit; and
   wherein said microcomputer means selectively forwards the control signal to the switching means according to existence and non-existence of at least one of a sync signal, a display data channel (DDC) signal and a USB signal received from a computer and according to a type of said at least one of a sync signal, a DDC signal and a USB signal.

2. The apparatus according to claim 1, wherein a predetermined voltage is supplied to the microcomputer means and a power supply to said circuits is cut off when the digital switch is turned "OFF".

3. The apparatus according to claim 1, wherein a predetermined power is supplied to perform DDC communication when the DDC signal is provided while the digital switch is in the "OFF" state, thereby cutting off the power.

4. The apparatus according to claim 1, wherein power is selectively supplied to a USB block when the USB signal is provided in the "OFF" state of the digital switch, thereby performing USB data transmission in the "OFF" state of the display unit.

5. The apparatus according to claim 1, wherein said switching means performs switching to supply the power to the circuits when the sync signals are provided by the computer in the "OFF" state of the digital switch, which cuts off the power.

6. A power control method using a digital switch in a display unit, comprising the steps of:
   selectively turning on and off power based upon a current state of a power ON flag when the digital switch is actuated;
   producing a power control signal corresponding to one of a display data channel signal and a universal serial bus signal by way of interrupt in a power OFF mode of said display unit; and
   returning said display unit to a normal mode in response to sync signals from a computer in the power OFF mode of the display unit;
   wherein, in response to said power control signal corresponding to the display data channel signal, a further control signal is generated so that power is supplied to only a portion of the display unit; and
   wherein, in response to said power control signal corresponding to the universal serial bus signal, a further control signal is generated so that power is supplied to a universal serial bus component.

7. A power control apparatus for a display unit having a universal serial bus (USB) hub, the apparatus comprising:
   a digital switch operable by a user to an off position and an on position;
   microcomputer means connected to said digital switch for producing a control signal for selectively switching a power management state of said display unit to an off mode and to a normal mode of operation according to off operation and on operation, respectively, of the digital switch;
   power supply means for supplying power to circuitry of the display unit; and
   s switching means for selectively switching power supply to a deflection stage and a video stage, respectively, of the display unit according to the control signal from the microcomputer means;
   wherein said microcomputer means selectively forwards the control signal to the switching means according to existence and non-existence of signals received from a computer associated with the display unit.

8. The apparatus according to claim 7, wherein the power to the display unit is switched using the digital switch, and a predetermined voltage is continuously supplied to the microcomputer means in both the off mode and the normal mode of the power management state.

9. The apparatus according to claim 7, wherein said signals received from said computer comprise sync signals.

10. The apparatus according to claim 7, wherein said signals received from said computer comprise a display data channel (DDC) signal.

11. The apparatus according to claim 7, wherein said signals received from said computer comprise a USB signal.

12. The apparatus according to claim 8, wherein said signals received from said computer comprise sync signals.

13. The apparatus according to claim 8, wherein said signals received from said computer comprise a display data channel (DDC) signal.

14. The apparatus according to claim 8, wherein said signals received from said computer comprise a USB signal.

15. The apparatus according to claim 7, wherein a predetermined voltage is supplied to the microcomputer means and the power supplied to the circuitry of said display unit is cut off when the digital switch is turned "OFF".

16. The apparatus according to claim 7, wherein a predetermined power is supplied to perform DDC communication when the DDC signal is provided while the digital switch is in the "OFF" state, thereby cutting off the power.

17. The apparatus according to claim 7, wherein power is selectively supplied to a USB block when the USB signal is provided in the "OFF" state of the digital switch, thereby performing USB data transmission in the "OFF" state of the display unit.

18. The apparatus according to claim 7, wherein said switching means performs switching to supply the power to the circuitry of said display unit when the sync signals are provided by the computer in the "OFF" state of the digital switch, which cuts off the power.

19. A power control method using a digital switch in a display unit, comprising the steps:
   actuating the digital switch;
   determining whether a power on flag is set;
   when the power on flag is set, producing a monitor off signal and assuming a power off mode;
   when the power on flag is not set, producing a monitor on signal; and when the power off mode is assumed, selectively providing a control signal to switch power supply to circuitry of the display unit according to existence and nonexistence of signals received from a computer associated with the display unit.

20. The method according to claim 19, further comprising the step, when the power on flag is set, of resetting the power on flag.

21. The method according to claim 19, further comprising the step, when the power on flag is not set, of setting the power on flag.

22. A power control method using a digital switch in a display unit, comprising the steps of:

maintaining an off mode of the display unit;

determining whether the digital switch is actuated;

when the digital switch is actuated, canceling the off mode of the display; and when the digital switch is not actuated, checking for an additional signal from a computer associated with the display unit, and selectively providing power to one of a portion of the display unit, a USB component and the display unit in its entirety in response to the additional signal from the computer.

23. The method according to claim 22, wherein said additional signal comprises a display data channel (DDC) signal; and wherein, when the DDC signal is detected, power voltage is supplied to the display unit.

24. The method according to claim 22, wherein said additional signal comprises a universal serial bus (USB) signal; and wherein, when the USB signal is detected, power is supplied to a USB component only of said display unit.

25. The method according to claim 22, wherein said additional signal comprises a sync signal; and wherein, when the sync signal is detected, the off mode of the display unit is canceled; and when the sync signal is not detected, the off mode of the display unit is maintained.

* * * * *